July 18, 1939.    H. G. CHANDLER    2,166,623
MULTIPLE DAMPER AND CONTROL
Filed Nov. 23, 1934    2 Sheets-Sheet 1

INVENTOR
Harry G. Chandler
BY Soule & Leonard
ATTORNEYS

July 18, 1939.   H. G. CHANDLER   2,166,623
MULTIPLE DAMPER AND CONTROL
Filed Nov. 23, 1934   2 Sheets-Sheet 2

INVENTOR.
Harry G. Chandler
BY
Soule & Leonard
ATTORNEYS.

Patented July 18, 1939

2,166,623

UNITED STATES PATENT OFFICE 2,166,623

MULTIPLE DAMPER AND CONTROL

Harry G. Chandler, Lakewood, Ohio

Application November 23, 1934, Serial No. 754,478

6 Claims. (Cl. 236—1)

This invention relates to stack and check dampers and control mechanism therefor, the principal features being illustratively shown in connection with a thermostatically controlled check damper for hot air furnaces.

The principal object of the present invention is to control the admission of air to the furnace flue in response to variations in temperature or other conditions at different and separate locations, and also in response to barometric conditions.

More specifically, an object is to provide a control mechanism which is responsive to room temperatures, furnace hood temperatures, the flue gas temperature, and also the furnace stack draft.

Another object is to provide a thermostatically operated damper mechanism which is also operated additionally in response to an electrical heating element which heating element, in turn, may operate in response to conditions other than those directly affecting and operating the damper.

Another object is to provide a thermostatically controlled electric motor for the operation of damper and the like in which the electric current is utilized only during successive intervals of actual operation of the damper.

Heretofore it has been the practice to control the draft conditions of the furnace by means of separate controls responsive to room temperatures, flue gas temperatures, or differentials in barometric pressure resulting from the stack and outside weather conditions, and a specific object of the present invention is to combine all such controls into a single device in which the operation of the various parts are so coordinated that the acceleration and deceleration in the rate of combustion and application of the heat are more uniform, gradual, and efficient, and over- and under-running of the desired high and low temperatures are at the points of use substantially eliminated.

In order to better appreciate the present invention, a brief review of the prior art is desirable. Heretofore, check and stack dampers have been operated by motors controlled, in turn, by room thermostats and frequently supplemented with various types of electrical limit controls which operate in response to changes in conditions influenced by the furnace, such as the bonnet temperature, stack temperature, and steam pressure.

Again, there are non-electric bi-metallic mechanisms, diaphragms of the bellows type, and other temperature responsive controls more directly responsive to the stack, bonnet, or water or steam temperature or pressure.

A third type of controls includes the barometric controls by which a balanced damper is operated due to changes in the stack draft of the furnace.

In the room type control, over-running and lagging of furnace temperature and rate of combustion are common, due to the fact that the changes in the heat provided by the furnace are not reflected promptly in the room. This action is partially overcome by the supplemental controls but such separate supplemental controls are comparatively expensive and complicated. The purely mechanical type responsive to the furnace is not satisfactory due to the fact that it operates independently of outside weather conditions and room temperatures, and consequently may either over-heat or under-heat the rooms. The barometric type, however, does operate in response to outside weather conditions, but not in response to room temperatures and only indirectly in response to furnace temperatures. Consequently, if the three types of controls can be embodied in a single unitary structure, predetermined uniform temperatures and more effective control of the furnace is possible and gradual and efficient changes in the rate of combustion and application of the resultant heat can be effected.

In the present structure all such controls have been embodied in a simple and effective mechanism which may readily be installed in furnaces of the type commonly used without any substantial alteration in the furnace.

Referring to the drawings.

Referring to the figures, the principal features of the present invention are shown for purposes of illustration as embodied in a check damper control for a domestic hot air furnace. It is apparent that if the usual furnace air inlet damper D is clamped in sufficiently open position at all times, the rate of combustion can be controlled solely by operation of a check damper of adequate capacity, the entire stack draft and consequently passage of air through the fuel bed being substantially eliminated by fully opening the check damper even though the damper D is open.

For this purpose a sleeve 1 of larger cross sectional area than the usual check flue, if required, is connected to the check flue F of the furnace, coaxially therewith, a suitable reduction sleeve, not shown, being provided for effecting the connection of the sleeve 1 and check flue F if the sleeve 1 is larger in cross section than the check flue of the particular furnace. At the inlet end of the sleeve 1 is a damper 2, carried by suitable spring spider arms 3 which yieldably engage the interior wall of the sleeve 1 and permit axial movement of the damper 2 for regulating the effective size of the air inlet opening into the sleeve 1. With the damper D fully open and while maintaining a hot fire which produces a full capacity effective stack draft in the furnace, the damper 2 is moved to a position such that the opening between it and the inlet end of the sleeve 1 permits the entrance of sufficient air to effect the proper balance with the full stack draft for substantially eliminating the flow of air into the furnace through the damper D. After the damper 2 has been regulated properly, it remains in the regulated position.

Figure 2:
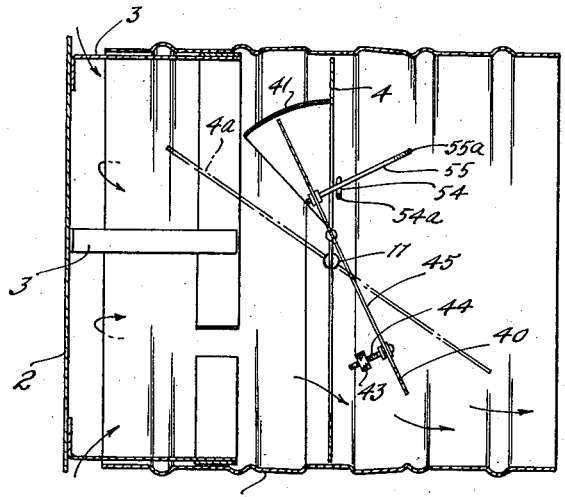
Fig. 2 is a reduced cross sectional view taken on a plane indicated by the line 2—2 of Fig. 1.

Within the sleeve 1 is a butterfly damper 4 which is operable by a motor 5, mounted on the outside of the sleeve 1, for controlling the rate of combustion thereafter, one open position of the damper 4 being designated by the dot and dash line 4a in Fig. 2. For mounting the motor 5 on the sleeve 1, a suitable collar 6 is rigidly secured to the sleeve 1 and accommodates a bushing 7 which, in turn, is rigidly secured to the housing plate 8 of the motor, the bushing 7 being secured in the collar by means of a suitable set screw. The driving shaft 10 of the motor is rotatably mounted in the bushing 7 and protrudes into the sleeve 1 at one end to engage a chuck 11 which, in turn, is connected to the damper 4 for rotating the same consequent upon rotation of the shaft 10.

The usual household current supply is of such high voltage that it is desirable to use a step-down transformer through which power is supplied to the motor, 10 to 15 volts being entirely adequate. Since alternating electric current is most commonly used, a motor suitable for use in connection therewith is shown, the motor also being operable by D. C. current.

Figure 4:
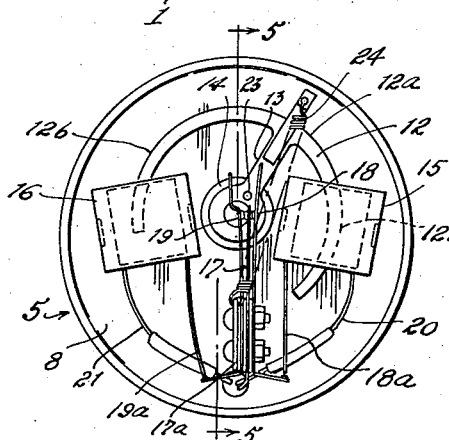
Fig. 4 is an end elevation of the solenoid motor.
Figure 5:
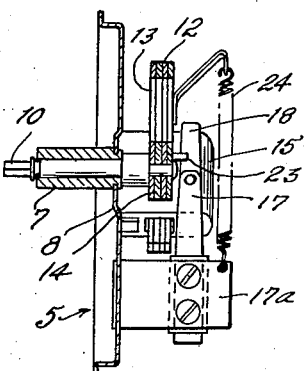
Fig. 5 is a sectional view of the motor and is taken on a plane indicated by the line 5—5 on Fig. 4.

Referring more particularly to Figs. 4 and 5 the motor may comprise an armature 12 rigidly secured to the shaft 10 and operable to rotate the shaft when the armature rotates. Since it is only necessary to rotate the damper through an angle of 90° to fully open and close it, the motor is preferably of the oscillating type. The armature 12 may comprise an arcuate laminated iron core concentric with the shaft 10 and provided midway between its ends with a radial spoke 13 terminating in a hub 14 rigidly secured to the shaft 10. Mounted on the housing plate 8 are a pair of solenoid coils 15 and 16 respectively, each having a central opening through which the corresponding portion of the armature 12 extends, the opening of each being sufficiently large to permit free passage of the armature as it rotates in either direction. Each of the coils is connected to the source of current through a different circuit and the coils are operable, when energized, to rotate the armature, one operating to rotate the armature in one direction and the other to rotate the armature in the opposite direction.

The armature 12 is shaped to present a larger cross section of metal at its midportion 12a than at its outer portions 12b the amount of metal being progressively less from the midportion towards the ends, as illustrated in Fig. 4. Consequently, there is no possibility that the armature and either coil, when energized, will reach a magnetic balance but the armature will continue to be moved through the coil energized by the coil until such movement is arrested by extraneous means.

Mounted on the plate 8 is a support 17a carrying a common electric contacter 17 which is connected to one side of the electric power circuit. At opposite sides of the common contacter 17 are movable contacters 18 and 19 respectively, the contacter 18 being connected to one terminal 18a of the coil 15 and the contacter 19 being connected to one terminal 19a of the coil 16. The other terminals, 20 and 21 respectively of the coils are arranged to be connected to the opposite side of the electric power circuit. Mounted on the hub 14 of the armature is an operating pin or shoulder 23, the shoulder being disposed between the contacters 18 and 19. The shoulder 23 swings to and fro as the armature rotates in opposite directions and in so doing engages and moves the contacters 18 and 19 successively out of contact with the common contacter 17.

Figure 7:
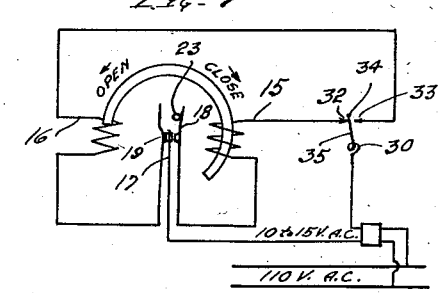
Fig. 7 is a diagrammatic illustration of the electrical circuit between the thermostat and the solenoid motor.

Referring to Fig. 7, when the armature has rotated to the right its full distance the shoulder 23 strikes the contactor 18 and breaks contact between it and the common contacter 17. Upon rotation of the armature in the opposite direction, the shoulder permits the contacter 18 to return into contact with the contacter 17 and upon continued movement in the opposite direction or to the left moves the contacter 19 out of contact with the contacter 17. The contacters 18 and 19 are mounted on resilient arms so as to return into contact with the contacter 17 when unobstructed by the shoulder and are electrically insulated from the common contacter and from each other and, if the support 17a is of conducting material, are likewise insulated therefrom.

Assuming that the coil 15 is energized, the armature rotates to the right past its dead center position and upon continued movement toward the right a predetermined distance, the circuit to the coil 15 is disconnected and the other circuit to the coil 16 is connected. Conversely if the armature is swung in the opposite direction a predetermined distance, the circuit to the coil 16 is disconnected and the circuit to the coil 15 again connected.

In order to insure movement of the armature the full distance to the right or left, a dead center spring 24 is provided, the spring being connected at one end to the armature at a point preferably along a radius through the midportion of the armature and well out from the hub 14, the other end of the spring being connected to a suitable stationary element such as the support 17a, preferably on a line through the center of rotation of the armature and the midportion of the armature when the same is at dead center position. The point of connection of the spring to the support 17a is on the opposite side of the center of rotation from the point of connection of the spring to the armature. The spring is always maintained in stressed condition, the greatest stress occurring when the armature is on dead center. Therefore, if the armature is moved slightly past dead center in either direction the spring will urge it in the same direction until it is stopped by a suitable abutment, for example, by engagement of the spoke with one of the coils or engagement of the ends of the armature and any suitable means. The mere overbalance of the armature shown will likewise cause such continued movement of the armature but is not as positive. In this way the operation of the motor to a desired position is effected and rebounding of the armature by striking its abutment is substantially eliminated.

Thus the contacters 18 and 19 are so arranged that when the armature has rotated considerably past dead center toward the particular coil connected in the circuit by a given contacter that contacter breaks contact with the common contacter.

If additional means are provided to make and break the circuits to the coils selectively, the damper can be moved readily to the desired position by rotation of the armature in the required direction and upon movement of the armature sufficiently to move the damper to either position, it will immediately break the circuit of the coil moving it to that position and connect the circuit of the coil that is to move it to the other position. Consequently in either circuit the current does not continue to flow but is immediately cut off when the desired position is reached, and no current is used again until the selective means are operated to close the other circuit. Upon closing the other circuit, however, a similar operation occurs. Consequently the current is utilized only during the instant the armature is actually moving.

For controlling this damper in response to temperature changes, a thermostat 30 is provided. The thermostat may be of the usual double contact type having stationary contacters 32 and 33, electrically insulated from each other and a common movable contacter 34 cooperable selectively with the contacters 32 and 33. The contacter 32, for example, is connected to the terminal 20 of the coil 15 and the contacter 33 is connected to the terminal 21 of the coil 16. The movable contacter 34 is connected to the side of the alternating current supply opposite to the terminal 17 of the motor. The movable contacter 34 is carried by a bi-metallic lever 35 which is responsive to temperature changes. The lever 35 is preferably arranged in the form illustrated so that upon heating it moves to the right and upon cooling it moves to the left.

Since it is desirable that the thermostat operate at different temperatures at different times, the contacters 32 and 33 may be mounted for movement to different positions relative to the movable contacter 34, thereby making contact in the circuit through the coil 16 and breaking contact in the circuit to the coil 15 when heated to a predetermined degree and breaking contact in the circuit to the coil 16 and making contact in the circuit in the coil 15 when cooled to a predetermined lower degree.

Referring to Fig. 7, and assuming the motor is connected to the damper 4 so that the damper is open when the armature is moved to the left and closed when the armature is moved to the right, it is apparent that upon heating of the thermostat to a predetermined degree, the armature will be made operable to open the damper. The armature will then remain in this open position until subsequent cooling of the room or source to which the thermostat is responsive. With the opening of damper 4 a lowering of the temperature readily occurs. As explained above, upon movement of the armature to position to open the damper, the circuit completed for this purpose by the thermostat is broken immediately by the contacter 19 and the other circuit which was already broken by the thermostat is connected to the motor through the contacter 18. Consequently no further operation will be effected so long as the thermostat remains in contact with the contacter 33 or intermediate the contacters 32 and 33 and electrical energy is utilized only for an instant. Immediately upon cooling of the thermostat, however, to a sufficient degree to effect contact of the contacter 34 with the element 32, the circuit connected by the contacter 18 to the motor is completed by the thermostat and operates the motor in the opposite direction whereupon this latter circuit is then immediately broken and the first circuit closed except for the thermostat.

It is apparent from the foregoing that the main damper 4 is controlled directly in response to room temperatures as above set forth. However, it is desirable that air be admitted to the furnace or furnace stack, for checking or otherwise controlling combustion, in response to temperatures or other conditions at a location different from the room thermostat 30, for example, at the furnace bonnet, flue, or at any other desired location remote from the first thermostat. For accomplishing this purpose, a damper 40 is provided, which for convenience in installation, economy in manufacture, and simplicity of control is carried on the main damper 4, thus becoming supplemental thereto in the particular illustrative example herein shown. The damper 4 is provided with an opening 40a of adequate size to check the furnace materially and to accommodate the damper 40 within its limits with just sufficient clearance to permit the damper 40 to swing freely therethrough about its pivots 42. The damper 40 is secured to the pivots 42 so that the pivotal axis is slightly above its center, thus exposing a larger area below the pivotal axis than above. Consequently, the damper 40 normally retains its upright position, but the larger area presented below the pivotal axis causes the damper to open inwardly when the atmosphere pressure exerted on its outer exposed face is greater than the pressure within the flue. A hood 41 is provided on the damper 4 for preventing entrance of air at the upper portion of the opening 40a when the damper 40 is partially open. In order to additionally adjust the over balance of the damper 40 so that it may respond to predetermined differentials in pressure within and outside of the flue, a weight 43 is provided on the damper 40 below the pivotal axis so as to urge the damper to a normally closed position. The weight 43 is mounted on a suitable screw threaded post 44 carried in the slot 45 in the damper 40, the post being slidable along the slot and changing the balancing effect of the weight 43. Additional adjustment of the weight is afforded due to its threaded engagement with the post 44 by virtue of which it may be moved nearer to and farther from the plane of the damper 40. The weight 43 is preferably drilled off center or otherwise unbalanced about its axis so as to swing downwardly about the post 44 and retain its adjusted position therealong. The balanced condition of the damper 40 is so adjusted that it will open in event of a predetermined excessive stack pull and thus immediately begin the checking operation for reducing and rendering uniform the stack draft in the furnace. It is not desirable, however, to permit the differential pressure control to completely check the draft and thus prevent a satisfactory acceleration in the rate of combustion. Such action would upset the desired results which are secured by the conjoint action of the damper 40 and the damper 4. The damper 40 opens sufficiently under differential pressure conditions to effect a uniform rate of acceleration of combustion under changing differential pressure conditions. With an acceleration of combustion there will usually occur higher flue or stack temperatures, the increase of which should be stopped at some predetermined temperature so as to avoid possible overheating of the furnace or too great an increase in the rate of combustion. These factors become difficult to control after they have unduly increased. Consequently an additional means of control cooperating with the damper 40 is utilized to control any undue increase or decrease in the results produced by the damper.

For this purpose, a thermostatically responsive device may be provided and positioned to be heated by the flue gases for additionally operating the damper 40.

Figure 1:
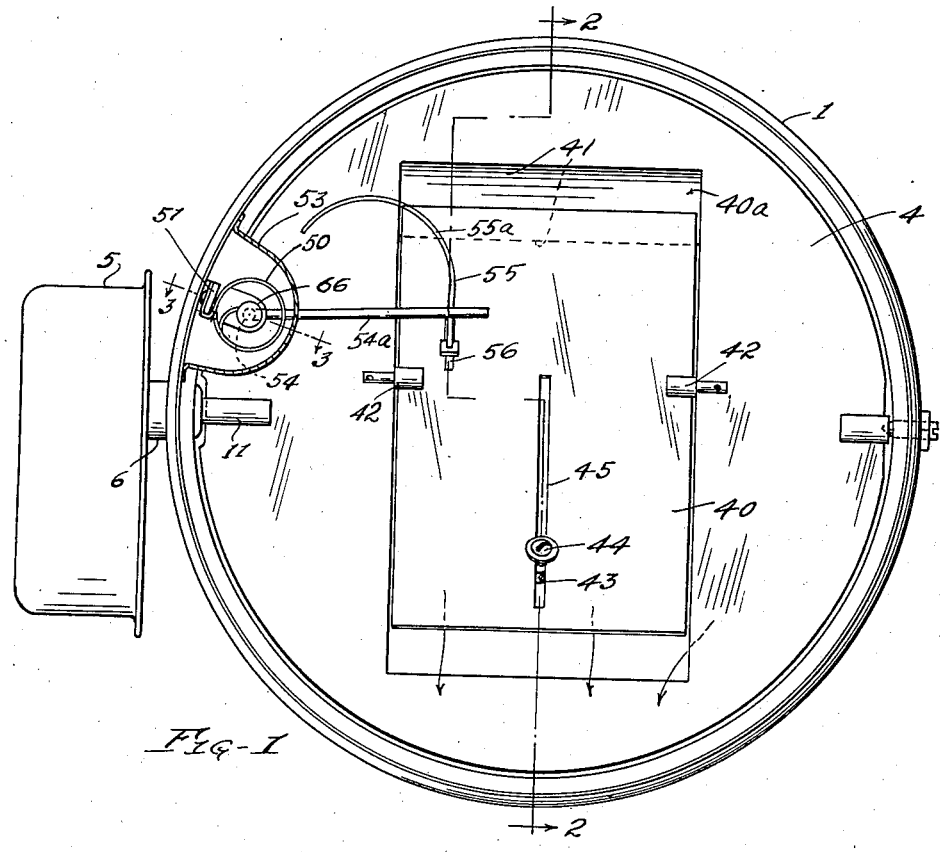
Fig. 1 is an end elevation of a damper mechanism embodying the principles of the present invention.
Figure 3:
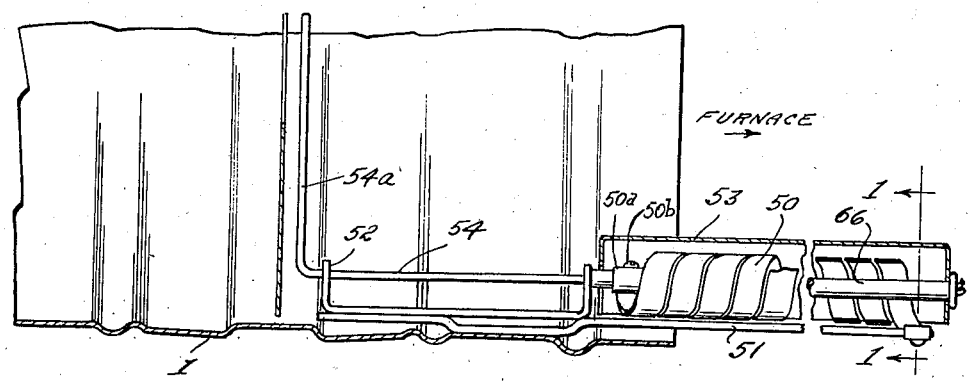
Fig. 3 is a sectional view taken on a plane indicated by the line 3—3 of Fig. 1.

Referring to Figs. 1 to 3, a bi-metallic coil 50, mounted on a suitable bracket 51 rigidly secured to the shell 1 of the main damper is provided. The bracket 51 is positioned so that the coil, when mounted thereon, is exposed to the flue gases inside of the flue between the furnace and the main damper and out of the path of the incoming cooler air. In the form illustrated wherein the device is located on the check flue, the coil 50 is beyond the upright discharge flue so that all gases issuing from the furnace immediately contact with the coil. Additionally, a suitable shield 53 is provided so that the cool air admitted by the checking operation does not directly cool the coil 50. Carried on the bracket 51 is a yoke 52 in which is mounted a rotatable shaft 54, the end of which, adjacent the main damper, is curved at an angle to the axis of the shaft 54 to provide an abutment 54a, arranged to operate the damper 40 consequent upon rotation of the shaft 54. One end of the thermostatic coil is rigidly fixed to the bracket 51 and the other end to the lug 50a, secured on the shaft 54 so that, upon heating and cooling of the coil, the shaft 54 is rotated. The lug 50a may be rotated to different positions on the shaft 54 and secured in the desired rotated position by a lock screw 50b for adjusting the normal tension of the coil 50.

Carried on the damper 40 is an abutment 55 positioned to be engaged by the abutment 54a to effect proper cooperation between the thermostatic coil and the damper 40. In the form illustrated, the coil 50 is arranged to swing the abutment 54a upwardly to the left consequent upon heating. The abutment 54a thereupon engages the under side of the abutment 55, which is located above the pivotal axis of the damper 40 and gradually rocks the damper 40 to an open position with the lower end of the damper disposed inwardly toward the furnace from the main damper 40. Consequently, because of this position of the hood 41, cool air admitted by the damper 40 is directed downwardly and into the furnace flue, the coil 50 preferably being arranged above the center and to one side of the damper 40 so as to be out of the path of the incoming cooler air. Additional adjustment of the operation of the damper 40 is effected by mounting the abutment 55 so that it may be adjusted to different positions in the form illustrated. The abutment 55 is mounted in a suitable slot 56 in the damper 40 for movement to different positions on the damper and relative to the abutment 54a. The outer end 55a of the abutment 55 is curved so that the abutment 54a will not swing out of engagement therewith. Furthermore by swinging the outer end 55a of the abutment about the axis of the portion 55 thereof, different rates of opening and closing of the damper 40 near its limits of operation can be effected. By adjusting the position of the abutment 55 or the lug 50a the damper can be regulated to open and close at the desired temperature.

From the foregoing it is clear that damper means are provided which are responsive to numerous different conditions, for example, to room temperature, stack temperature and differentials in pressure within and outside of the flue. In some instances, however, it is still further desirable to admit air in response to the bonnet temperature of the furnace or to temperatures or other conditions at locations different from the room thermostat and flue. For accomplishing this purpose an electrical heating element 66 is provided, the element 66 preferably being suitably insulated to avoid fouling by foreign matter in flue gases. The element 66 is connected in an electrical circuit with a thermostat 57, so that upon closing the circuit by the thermostat the element heats electrically and thus either alone, or in conjunction with local heat conditions, operates the coil 50. For example, if the thermostat 57 is placed adjacent the furnace bonnet, and a sufficiently high temperature is reached at the bonnet before the flue gases have heated the coil 50 to effect the checking operation, the thermostat closes and the heating element 66 thereupon very rapidly heats the coil 50 to accelerate this checking operation. While the heating element 66 has been shown in connection with a damper which is supplemental to the main damper, obviously it would be effective for operating the main damper itself, and could be used with any of the make and break electric circuit control responsive to steam pressures or other conditions and with a thermostatic coil responsive to it alone or to it and local heat conditions together. Thus the checking operation is effected in response to conditions at both local and remote locations.

Figure 6:
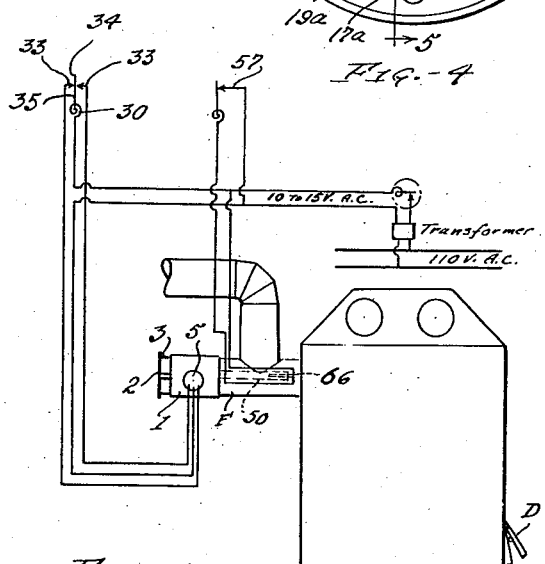
Fig. 6 is a diagram of the electrical circuits used in connection with the present invention.

Referring to Fig. 6, assuming that the damper 2 has been adjusted to provide the maximum checking effect and the damper D of the furnace has been adjusted to the desired open position for the particular house installation, obviously, full control of the rate of combustion can be effected by operation of the check damper means herein provided and undue heating of the room or furnace or undue lagging or over-running of the heat can be eliminated. For instance, if the acceleration of the rate of combustion becomes too intense, the stack pull tends to increase rapidly. This is first partly checked by the operation of the damper 40, due to the greater pressure of the outside air relative to that within the flue, Thus the rate of combustion is slowed down and the rate of increase is more gradual. If, however, this is not sufficient, or the flue becomes unduly heated the coil 50 operates and more rapidly and widely opens the damper 40 to effect additional checking operation. It may be, however, that sufficient gases have been evolved to heat the hood of the furnace unduly, in which event the thermostat 57 will operate the heating element 56 to heat the coil 50 additionally and even more rapidly opening the damper 40 so that the furnace is additionally checked and the rate of increase in combustion is greatly reduced. Eventually, however, the room temperature is brought up to that required, in which case the thermostat 30 operates thus opening the main damper 4 and fully checking the furnace without the necessity of closing damper D.

Since the abutment 54a engages the under side of the abutment 55, it is obvious that it will hold it in a certain predetermined position. For example, it holds the damper 40 partially open and permits movement of the damper 40 to a more open position by barometric pressure, uninfluenced by the abutment 54a. If, however, the flue temperature is at a high degree when the main damper opens, which is the usual condition, the coil 50 has operated the abutment 54a so as to hold the damper 40 in substantially horizontal position and parallel to the damper 4, thus affording full capacity of check at the right time. Immediately a gradual cooling of the stack temperature begins which causes the thermostatic coil 50 to cool and slowly allow the damper 40 to swing to a vertical position so as to act as a partial baffle of air passing the main damper. This prevents too rapid checking of the draft and consequently too great deceleration of combustion, thus rendering the eventual drop in temperature more gradual and uniform and anticipating to some extent the eventual drop in room temperature which will eventually close the damper 4. Thus a closer balance between the rate of combustion and the room temperature is effected.

If under the conditions above recited, a window were suddenly opened and the room chilled, the thermostat 30 would operate to effect closing of the damper 4. However, this would not cause too great increase in the rate of combustion if the furnace were already supplying sufficient heat or supplying heat as rapidly as it can be carried to the room, without overheating of the furnace due to the other controls.

Thus, in any case, though the furnace may be partially checked or controlled by either of the check or stack dampers, in response to any one of the controls, it cannot be completely unchecked except upon the conjoint operation of all of them.

Having thus described my invention, I claim:

1. A damper mechanism for furnaces comprising a main flue damper, thermostatic means responsive to temperature conditions at a location remote from the flue for controlling operation of said main damper, a supplemental damper carried by the main damper, and thermostatic means operable in response to temperature conditions created by the furnace adjacent the supplemental damper to operate said supplemental damper.

2. A damper mechanism for furnaces comprising a main damper, a supplemental damper carried thereby and movable by differentials in pressure at opposite faces thereof independently of the main damper, means for operating the main damper independently of the supplemental damper, an abutment on the supplemental damper, and a lever cooperable therewith to move the supplemental damper to different positions, said lever being disengageable from said abutment consequent upon predetermined differentials in pressure at opposite faces of the supplemental damper, whereby the supplemental damper may operate on predetermined differentials in pressure independently of the lever.

3. A check damper mechanism for a furnace having a flue comprising a main damper, a supplemental damper carried thereby, means operative in response to heat conditions at a given location remote from the flue for opening and closing the main damper, and additional means operative in response to heat conditions in the flue of the furnace for operating the supplemental damper.

4. A check damper mechanism for a furnace having a stack, comprising a sleeve adapted for connection at one end to and in communication with the furnace stack, and being open at the other end for receiving outside air, a main damper mounted in the sleeve for movement to open and closed positions, means responsive to changes in temperature created by the furnace for opening and closing the main damper, a thermostatic lever means carried by the sleeve and responsive to changes in temperature of the products of combustion from the furnace, a supplemental damper carried on the main damper, and means operatively connecting the thermostatic lever means and supplemental damper for opening and closing the supplemental damper thereby.

5. A damper mechanism for a furnace having a flue, comprising a damper operable by differentials in pressure of gases in the flue and the atmosphere to admit air to the furnace, thermostatic means responsive to the temperature of the products of combustion passing through said flue to partially open said damper means, means adapted to heat said thermostatic means and thermostatically responsive means responsive to changes in temperature remote from the furnace adapted to control said heating means.

6. A damper mechanism for a furnace structure having a flue, comprising a damper operated by differentials in pressure within and outside the flue to admit air to the flue, an abutment on said damper, a lever having an abutment cooperable with the damper abutment, means responsive to heat conditions influenced by the furnace to operate the lever and move said damper to predetermined open positions through the medium of said abutments and being operatively disengaged from said damper abutment for permitting additional movement of the damper to more widely opened positions by said differentials in pressure within and outside the flue uninfluenced by said lever.

HARRY G. CHANDLER.